Patented Dec. 12, 1944

2,364,613

UNITED STATES PATENT OFFICE 2,364,613

PURIFICATION OF LANTHANUM SALTS

Albert E. Ballard and Lawrence E. Martinson, Rochester, N. Y., assignors to Eastman Kodak Company, Rochester, N. Y., a corporation of New Jersey No Drawing. Application February 5, 1942, Serial No. 429,660

7 Claims. (Cl. 23—102)

This invention relates to the purification of rare earth compounds and to glass made therefrom. More particularly, it relates to the preparation of lanthanum oxide ($La_2O_3$) suitable for preparing color-free optical glasses.

The sources of lanthanum are the various rare earth containing minerals such as the monazite sands from which the lanthanum is separated by methods which are described in some detail in the literature. While the lanthanum can be obtained in relatively pure salt forms by repeated recrystallizations, these salts ordinarily still retain small amounts of impurities in the form of iron salts and the more closely related cerium salts. The elimination of the last traces of these and other impurities has been accomplished heretofore only with considerable difficulty and expense. This has been particularly true in the case of the soluble double salt of ammonium lanthanum nitrate, which fact has restricted its usefulness as a source of lanthanum oxide in the art of making certain optical glasses. It has been our experience that the presence of even very small traces of iron and cerium in the lanthanum oxide results in glasses having a distinctly yellow or amber color. For example, an amount of cerium oxide ($CeO_2$) no greater than 0.1% by weight based on the weight of the glass, gives a yellow colored glass with materials which normally in the absence of any cerium would yield a practically colorless product. Iron impurities give amber colored glasses. It will be appreciated that the presence of appreciable color in certain optical glasses would make such glasses impractical of use in systems where the absence of color is a critical requirement. We have now found that this disadvantage can be overcome by our new process of purification. Lanthanum salts such as the acetate, bromate, bromide, chloride, nitrate, and the like, which contain iron and cerium as impurities, can be rendered sufficiently free of these elements by our process so so that the lanthanum oxide and the glasses derived therefrom are free from all objectionable color.

It is an object of our invention, therefore, to provide a method for the preparation of pure lanthanum oxide. Another object is to prepare the pure lanthanum oxide from the double salt of ammonium lanthanum nitrate. A further object is to prepare lanthanum oxide which is suitable for making practically colorless optical glasses.

In the carrying out of the process of our invention, ordinarily we start with the soluble double salt of ammonium lanthanum nitrate, as obtained by the usual extraction methods from monazite sands and purification by repeated recrystallizations, dissolve it in water to approximately a 25 per cent solution, add aqueous 30 per cent hydrogen peroxide and solid ammonium carbonate, and heat the solution to the boiling point. At first, some white lanthanum carbonate is precipitated, but as the solution approaches the boiling point there is a gradual additional precipitation in the form of a light yellow, easily filterable, precipitate of iron and cerium. After settling for a short time, the solution is filtered, and the filtrate either evaporated to dryness and the residue ignited directly to the lanthanum oxide, or preferably, the filtrate is treated with oxalic acid and the precipitated lanthanum oxalate filtered off and ignited to the lanthanum oxide. The latter is employed directly in admixture with other metallic oxides to form optical glasses having the composition and properties such as those described by Eberlin and De Paolis, in their U. S. Patent No. 2,241,249, issued May 6, 1941.

In our process, the hydrogen peroxide converts any cerium or iron to the higher oxidized form and need be employed in excess only slightly greater than that required for this conversion. The ammonium carbonate neutralizes the nitric acid, or any other mineral acid, which may be present in the particular lanthanum salt to be purified, and is employed in an amount sufficient to raise the pH to the point necessary to neutralize all the mineral acid and to precipitate a small amount of lanthanum carbonate which can be returned to the system, in the next batch to be purified. The iron is precipitated as a hydroxide, whereas the cerium is precipitated in some complex form of easily filterable hydroxide and carbonate. The reaction itself will not take place at ordinary room temperature, but only at temperatures approaching the boiling point of the solution, i. e., in excess of 80° C. A distinct advantage possessed by our process is that all the reagents employed are volatile and easily eliminated in the subsequent step of ignition of the lanthanum oxalate to the oxide.

The invention is illustrated further by the following example:

Example 150 grams of the double ammonium lanthanum nitrate salt ($La(NO_3)_3 \cdot 2NH_4NO_3 \cdot 4H_2O$), which contained cerium equivalent to 0.14% $CeO_2$, were dissolved in 600 ccs. of water, 2.5 ccs. of aqueous 30 per cent hydrogen peroxide were added, followed, by 3 to 4 grams of solid ammonium carbonate. The solution was heated to boiling and then allowed to stand until most of the light yellow precipitate which formed had settled. The solution was then filtered, and the filtrate treated with a slight excess of oxalic acid to precipitate the lanthanum as the insoluble lanthanum oxalate. The latter was filtered off and ignited, thereby yielding a very pure lanthanum oxide. A glass prepared from a mixture consisting on a weight basis of 26% of the above prepared lanthanum oxide, 18% tungsten oxide, 12% thorium oxide, 12% barium oxide and 32% boric oxide was practically colorless, whereas the glass control sample prepared in the same way, but employing lanthanum oxide prepared without the benefit of the intermediate step of our invention from the same double salt was very yellow in color.

While our invention has been illustrated more particularly with a double salt of ammonium lanthanum nitrate containing cerium equivalent to 0.14 per cent $CeO_2$ as an objectionable impurity, and is primarily concerned with quantities of cerium and iron of this order or even less, it will be understood that our process is likewise applicable if desired, to the purification of soluble lanthanum salts containing many times this amount of impurities. For larger amounts of iron and cerium, it is only necessary to increase the quantity of reagents employed. Also the solution concentration of the salt to be purified is not at all critical, since concentrations as low as 5 per cent or even less, as well as concentrations somewhat higher than 25 per cent can be successfully employed, such higher concentrations being limited only by the solubility of the particular lanthanum salt to be purified.

We claim:

1. A process for removing color-imparting elements from water-soluble lanthanum salts comprising treating an aqueous solution of the salt with hydrogen peroxide and ammonium carbonate, heating the solution above 80° C. and filtering.

2. A process for removing color-imparting elements from water-soluble lanthanum salts comprising treating an aqueous solution of the salt with hydrogen peroxide and ammonium carbonate, heating the solution to the boiling point and filtering.

3. A process for removing color-imparting elements from water-soluble lanthanum salts comprising treating an aqueous solution of the salt with an excess of hydrogen peroxide over the amount required to convert all the ions capable of conversion to the higher oxidized state, and sufficient ammonium carbonate to neutralize any free acid ions present and to just start to precipitate lanthanum, heating the solution to boiling and filtering.

4. A process for removing iron and cerium from water-soluble lanthanum salts comprising treating an aqueous solution of the salt with an excess of hydrogen peroxide over the amount required to convert cerium and iron ions to the higher oxidized state, and sufficient ammonium carbonate to neutralize any free acid ions present and to just start to precipitate lanthanum, heating the solution to boiling and filtering.

5. A process for removing iron and cerium from the double salt of ammonium lanthanum nitrate comprising treating an aqueous solution of the salt with an excess of hydrogen peroxide over the amount required to convert cerium and iron to the higher oxidized state, and sufficient ammonium carbonate to just start to preciptate lanthanum, heating the solution to boiling and filtering.

6. A process for removing iron and cerium from water-soluble lanthanum salts containing less than one per cent by weight of these elements calculated as oxides, comprising treating an aqueous solution of the salt with an excess of hydrogen peroxide over the amount required to convert cerium and iron to the higher oxidized state, and sufficient ammonium carbonate to just start to precipitate lanthanum, heating the solution to boiling and filtering.

7. A process for removing iron and cerium from the double salt of ammonium lanthanum nitrate containing less than one per cent by weight of these elements calculated as oxides, comprising treating an aqueous solution of the salt with an excess of hydrogen peroxide over the amount required to convert cerium and iron to the higher oxidized state, and sufficient ammonium carbonate to just start to precipitate lanthanum, heating the solution from 80° C. to the boiling point and filtering.

ALBERT E. BALLARD.
LAWRENCE E. MARTINSON.